United States Patent
Grootaert et al.

[11] Patent Number: 5,882,466
[45] Date of Patent: Mar. 16, 1999

[54] AQUEOUS BONDING COMPOSITION

[75] Inventors: Werner M. A. Grootaert, Oakdale, Minn.; Dirk H. C. Arren, Schoten; Rudolf J. Dams, Zwijndrecht, both of Belgium

[73] Assignee: Minnesota Mining and Manufacturing Company, St. Paul, Minn.

[21] Appl. No.: 695,141

[22] Filed: Aug. 8, 1996

[51] Int. Cl.$^6$ .................................................... C09J 4/00
[52] U.S. Cl. ..................... 156/329; 156/233; 156/307.7
[58] Field of Search .................. 156/233, 307.7, 156/329

[56] References Cited

U.S. PATENT DOCUMENTS

| | | | |
|---|---|---|---|
| 2,732,398 | 1/1956 | Brice et al. | 260/503 |
| 2,759,019 | 8/1956 | Brown et al. | 260/556 |
| 2,764,602 | 9/1956 | Ahlbrecht | 260/404.5 |
| 2,764,603 | 9/1956 | Ahlbrecht | 260/404.5 |
| 2,809,990 | 10/1957 | Brown | 260/534 |
| 2,915,554 | 12/1959 | Ahlbrecht et al. | 260/556 |
| 3,094,547 | 6/1963 | Heine | 260/461 |
| 4,558,142 | 12/1985 | Holland et al. | 549/465 |
| 4,882,390 | 11/1989 | Grootaert et al. | 525/326.3 |
| 5,098,446 | 3/1992 | Rodreguez et al. | 8/94.26 |
| 5,216,085 | 6/1993 | Guenthner et al. | 525/351 |
| 5,284,611 | 2/1994 | Grootaert et al. | 264/135 |
| 5,468,353 | 11/1995 | Anich et al. | 204/105 R |
| 5,478,652 | 12/1995 | Grootaert et al. | 428/422 |
| 5,500,042 | 3/1996 | Grootaert et al. | 106/287.11 |

FOREIGN PATENT DOCUMENTS

| | | | |
|---|---|---|---|
| 4 244 810 | 9/1992 | Japan | B29B 11/16 |
| WO 96/04339 | 2/1996 | WIPO | C08L 83/00 |

OTHER PUBLICATIONS

Arai et al., JP 61034062, Abstract and Structures, available in STN database, HCAPLUS and REGISTRY files, Feb. 1986.

Product Brochure entitled "A Guide to Dow Corning Silane Coupling Agents", Form No. 23–012B–85, published by Dow Corning Corporation, Midland, Michigan.

Product Brochure entitled "Dynamar® Bond Metal Bonding Agent—5150", Brochure No. Y–IFE5150–2 (73.05)RI, published by the 3M Company, 1983.

Kirk–Othmer Encyclopedia of Chemical Technology—Fourth Edition, vol. 8, pp. 990–1005 (1993).

*Primary Examiner*—Scott W. Houtteman
*Attorney, Agent, or Firm*—Daniel C. Schulte

[57] ABSTRACT

An aqueous bonding composition comprising a silane compound, a water-soluble surface tension-reducing compound, water, and substantially no organic solvent, and a method of using said aqueous bonding composition. The aqueous bonding composition can be used to produce a bonded article comprising a fluoropolymer bonded to a substrate.

23 Claims, No Drawings

AQUEOUS BONDING COMPOSITION

FIELD OF THE INVENTION

This invention relates to an aqueous bonding composition for use in bonding a fluoropolymer material to a substrate. The aqueous bonding composition contains a silane compound, a water-soluble adhesion-promoting compound, and water.

BACKGROUND

Silane compounds are used to improve adhesion between polymeric materials and substrates such as organic materials (e.g., hydrocarbon-based polymeric materials), and inorganic materials, including metals, fiberglass and glass (see for example, "A Guide to Dow Corning Silane Coupling Agents", Form No. 23-012B-85, published by Dow Corning Corporation, Midland, Mich.). In some applications, compositions comprising silane compounds are hydrolyzed to their silanol form, which may then react with the substrate, e.g., by reacting with hydroxyl moieties present in an inorganic material. The silane compound can also include an organofunctional group that reacts with the substrate to enhance the bond strength between the substrate and the silane. Compositions comprising silane compounds have been successfully used as adhesion promoters with some fluoropolymers, see for example, "'Dynamar' Bond Metal Bonding Agent—5150", Brochure No. Y-IFE5150-2 (73.05) RI, published by the 3M Company, 1983.

Past silane-containing aqueous bonding compositions have generally included an organic solvent component. Although these bonding compositions have also contained minor amounts of water to hydrolyze the silane compound, a major portion of these bonding compositions has been organic solvent. Organic solvent is useful within a bonding composition because, among other reasons, organic solvents generally have low surface tensions, allowing good wetting of a substrate. Recently, the use of organic solvents in industry has become disfavored due to their harmful environmental effects, and because of health and safety concerns. Industry has made concerted efforts to eliminate solvent-based coatings and compositions, and replace them with aqueous formulations. What is needed but not provided by the prior art is an aqueous bonding composition that effectively bonds a fluoropolymer to a substrate.

SUMMARY OF THE INVENTION

The present invention provides an aqueous bonding composition that provides improved adhesive bond strength between a fluoropolymer and a substrate. Because a major portion of the solvent component of the aqueous bonding composition is water, the aqueous bonding composition reduces or eliminates the presence of organic solvent within the aqueous bonding composition. Elimination of organic solvent can eliminate the potential harmful effects of such solvent on the environment, and can also eliminate any health and safety concerns otherwise present when using organic solvents.

An aspect of the present invention relates to an aqueous bonding composition comprising a silane compound, a water-soluble surface tension-reducing compound, and water. The aqueous bonding composition contains substantially no organic solvent. The water-soluble surface tension-reducing compound comprises a surface-tension reducing group, and a group that imparts water solubility to the water-soluble surface tension-reducing compound. Preferred water-soluble surface tension-reducing compounds include compounds of general formula (1):

wherein $R^1$ is hydrogen or a lower alkyl; $R_f$ is a surface-tension reducing group such as a fluoroaliphatic group, preferably a perfluoroaliphatic group; Q is a divalent linking group preferably comprising an electron-withdrawing group such as sulfonyl or carbonyl; X is a divalent linking group; and Z is a group that imparts water solubility to the water-soluble surface tension-reducing compound.

Another aspect of the invention relates to bonded articles comprising a fluoropolymer bonded to a substrate with the above-described aqueous bonding composition. The bonded article can be designed for use in various applications. As one example, the bonded article can be designed for use as a core, support, or insert used in one of various molded seals, such as a shaft seal, a valve stem seal, or a gasket.

Yet another aspect of the present invention relates to a method of improving the adhesive bond strength between a fluoropolymer and a substrate using the above-described aqueous bonding composition. The method comprises the steps of providing the above-described aqueous bonding composition, providing a substrate and a fluoropolymer, applying the aqueous bonding composition to one or more of the substrate or the fluoropolymer, and applying the fluoropolymer to the substrate to construct a bonded article comprising the fluoropolymer bonded to the substrate.

As used within the present description the term "aqueous," as in "aqueous bonding composition" means that a major portion of the solvent component (i.e., the non-solid ingredients) of the aqueous bonding composition is water. For instance, the solvent component can be at least 50 percent by weight, preferably 90 percent by weight, and more preferably at least 99 percent by weight water. Most preferably, the solvent component of the aqueous bonding composition contains no organic solvent, and is 100 percent water.

DETAILED DESCRIPTION

The present invention provides an aqueous bonding composition that can be used to create or enhance an adhesive bond between a fluoropolymer material and a substrate. Fluoropolymer materials useful in this invention include fluorine-containing polymers comprising interpolymerized, monomeric units derived from olefinically unsaturated fluorinated monomers. Examples of such unsaturated fluorinated monomers include vinylidene fluoride (also referred to as $VF_2$ or VDF), hexafluoropropylene (HFP), tetrafluoroethylene (TFE), chlorotrifluoroethylene (CTFE), 2-chloropentafluoro-propene, perfluoroalkyl vinyl ethers (e.g. $CF_3OCF=CF_2$ or $CF_3CF_2OCF=CF_2$), 1-hydropentafluoropropene, 2-hydropentafluoropropene, trifluoroethylene, vinyl fluoride, and perfluoro-1,3-dioxoles such as those described in U.S. Pat. No. 4,558,142 (Squire), and fluorine-containing di-olefins, such as perfluorodiallylether and perfluoro-1,3-butadiene.

The fluoropolymer may also comprise interpolymerized monomeric units derived from fluorine-free olefinically unsaturated monomers, as is known in the fluoropolymer art. The fluorine-free olefinically unsaturated monomers can be represented as having the formula R'R'C=CR'R' wherein each R' group can be the same or different, and can be hydrogen or an aliphatic radical such as an alkenyl or an alkyl radical. Where R' is alkenyl or alkyl, R' can be a straight chain or branched, and can have from one to four carbon atoms. Examples of useful fluorine-free olefinically unsaturated monomers include ethylene, propylene, butene-1, and butadiene.

The fluoropolymer may also comprise interpolymerized monomeric units derived from iodine- or bromine-containing cure-site monomers, in order to prepare a peroxide-curable fluoropolymer. Suitable such cure-site monomers include terminally unsaturated monoolefins of 2 to 4 carbon atoms such as bromodifluoroethylene, bromotrifluoroethylene, iodotrifluoroethylene, and 4-bromo-3,3,4,4-tetrafluoro-butene-1.

The molar ratio of different monomers used to prepare the fluoropolymer can be chosen to achieve desired properties (e.g., chemical resistance (resistance to fuel, coolants, lubricants, etc.), high temperature stability, low temperature flexibility), in the cured fluoropolymer. The selection of monomeric ratios can be based on relationships known to exist between particular monomers and the physical properties of the resulting copolymer. Examples of generally useful fluoropolymers include the fluoroelastomers described in The Kirk-Othmer Encyclopedia of Chemical Technology—Fourth Edition, vol.8 pages 990–1005 (1993). These include fluoropolymers of $VF_2$/HFP, $VF_2$/HFP/TFE, $VF_2$/propylene/TFE, and others. Such fluoropolymers can be prepared by methods that are well known in the fluoropolymer art, and that are also described by Kirk-Othmer, 1d., at pages 993–5. In general, useful fluoropolymers can be prepared by well known high pressure, free-radical, aqueous, emulsion polymerization methods.

Many useful fluoropolymers are also available commercially. Examples of commercially available fluoropolymers include those available from the Dyneon Corporation of St. Paul Minn. under the trade names Fluorel™ FC-2176, FT-2350, FC-2177, FE-5640, FE-5642, FE-5840, FE-5622, as well as AFLAS fluoroelastomers, commercially available from Asahi Glass Co. Japan.

The substrate can be any suitable material useful as a support for a multi-layer article comprising a fluoropolymer bonded to the substrate, and that by use of the inventive aqueous bonding composition, can effectively be adhered to a fluoropolymer. Examples of useful substrates include inorganic substrates such as metals (e.g., steel, including carbon steel and stainless steel, brass, aluminum, etc.) materials of glass or glass fibers, or one of several known organic materials, such as a polysulfide, polyimide, or Kevlar™. Alternatively, the substrate can be other fluoropolymers or fluoroelastomers that are known in the fluoropolymer art to be useful as a substrate, including nitrile rubber, hydrogenated nitrile rubber, epichlorohydrin, EPDM (ethylene-propylene-diene) terpolymer, etc.

The aqueous bonding composition of the present invention can be a solution, dispersion, or mixture containing a silane compound. The silane compound comprises a hydrolyzable group (e.g., alkoxy and/or acetoxy group) and a group that is reactive with the fluoropolymer (a "fluoropolymer-reactive group"). The fluoropolymer-reactive group can be any of a number of chemical groups that are known in the fluoropolymer art to be reactive with fluoropolymers, including amine groups, diazo groups, mercaptan groups, mercaptide groups, phenoxide groups, etc. It is believed that in use, the water within the aqueous bonding composition hydrolyzes the hydrolyzable groups to form hydroxyl moieties. The hydroxyl moieties are believed to react with the surface of the substrate, and also with the hydroxyl moieties of other silanol molecules (via condensation reactions), to result in polysiloxane molecules bonded to the surface of the substrate. At the same time, the fluoropolymer-reactive group bonds to the fluoropolymer. Overall, the silane compound is thought to form polysiloxane molecules that attach to the fluoropolymer (by the fluoropolymer-reactive groups) and to the substrate (by the hydrolyzable groups), to provide an adhesive bond between the fluoropolymer and the substrate.

Preferred fluoropolymer-reactive groups are amino groups, and preferred silane compounds are therefore aminosilanes. Useful aminosilane compounds include di- or tri-alkoxy (e.g., methoxy, ethoxy, etc.) or acetoxy silanes having one or two organo groups bonded directly to a silicon atom. At least one of the organo groups preferably comprises a primary amino moiety. As an example, a class of useful aminosilane compounds is the class of aminosilanes having the general formula:

$$(R^2O)_aSi(R^3)_b \qquad (2)$$

where a is 2 or 3, preferably 3; b is 1 or 2, preferably 1, and a+b is 4; each $R^2O$ group is independently a monovalent, organic, hydrolyzable group such as an alkoxy group having 1 to 8, and preferably 1 to 4 carbon atoms, e.g. methoxy, ethoxy or acetoxy groups; each $R^3$ group is independently a monovalent organic radical selected from the group consisting of alkyl, alkenyl, and aryl radicals, and combinations thereof such as arylalkyl and arylalkenyl radicals, wherein at least one $R^3$ group contains a group that is reactive with the fluoropolymer (e.g., a primary amino moiety). $R^3$ may be straight chain, branched, and, where sufficiently large, cyclic. $R^3$ may contain one or more catenary (i.e., backbone) hetero atoms such as sulfur, oxygen, and nitrogen, and may be substituted with such hetero atoms. Generally $R^3$ will have from 1 to 20 carbon atoms, and preferably will have from 1 to 12 carbon atoms. Some of the $R^3$ groups can be represented by the general formula:

$$-(R^4NH)_c-R^5NH_2 \qquad (3)$$

where c is an integer from 1 to 5, preferably from 1 to 3; $R^4$ and $R^5$ are divalent organic moieties such as alkylene, alkenylene, arylene moieties or combinations thereof $R^4$ and $R^5$ can generally have from 1 to 10 carbon atoms, and preferably contain from 1 to 4 carbon atoms. Examples of $R^4$ and $R^5$ moieties include propylene, ethylene, butylene, oxydiethylene or phenylene moieties.

Examples of useful aminosilane compounds include:
3-aminopropyltriethoxysilane,
N-(2-aminoethyl-)3-aminopropyltrimethoxysilane,
N-[2(vinylbenzylamino)ethyl]3-aminopropyltrimethoxysilane,
4-aminobutyltriethoxysilane, (aminoethylaminomethyl) phenethyltrimethoxysilane,
N-(2-aminoethyl)-3-aminopropylmethyldimethoxysilane,
N-2-aminoethyl-3-aminopropyltris(2-ethylhexoxy)silane,
6-(aminohexylaminopropyl)trimethoxysilane,
p-aminophenyltrimethoxysilane,
3-(1-aminopropoxy)-3,3-dimethyl-1-propenyltrimethoxysilane, 3-aminopropyltris(methoxyethoxyethoxy)silane,
3-aminopropylmethyldiethoxysilane,
3-aminopropyltriethoxysilane,
3-aminopropyltrimethoxysilane, and
ω-aminoundecyltrimethoxysilane.

The aqueous bonding composition can contain one or a mixture of two or more of these or other silane or aminosilane compounds. Aminosilane compounds can be prepared by known methods, including those described in "Technical Bulletin Pigments", No. 75, published by the Degussa Corporation, Ridgefield Park, N.J., brochure no. Pig. 75 1-4-1288 DD, issued December 1988, pp. 5–6. Also, aminosilane compounds are commercially available, for example, from the Dow Corning Corporation, as DOW CORNING® A-1100, Z-6020, Z-6026 and Z-6032 silanes; and from Petrarch Systems, Bristol, Pa., as A0695, A0696, A0698, A0699, A0700, A0710, A0720, A0724, A0725, A0728, A0733, A0742, A0750, A0800, and A0808.

The silane compound can be present in the aqueous bonding composition in any amount that will provide effective adhesion-promoting properties. For instance the aqueous bonding composition can comprise from about 0.1 to 10 parts by weight silane compound, more preferably from about 1 to 5 parts by weight silane compound, based on 100 parts of the aqueous bonding composition. As used herein with reference to parts by weight of components of the aqueous bonding composition, "aqueous bonding composition" refers to the water, silane compound, and water-soluble surface tension-reducing compound in the aqueous bonding composition, although it is understood that additional ingredients may also be included within the aqueous bonding composition.

The water-soluble surface tension-reducing compound allows for increased adhesive bond strength between fluoropolymer and substrate. One class of preferred water-soluble surface tension-reducing compounds includes compounds comprising a surface tension-reducing group, and a group that imparts water solubility to the surface tension-reducing compound. Examples of such compounds can have general formula (1):

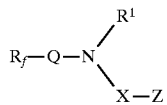

wherein: $R^1$ is hydrogen or a lower alkyl (e.g., methyl, ethyl, butyl), preferably hydrogen.

$R_f$ is a surface-tension reducing group. Preferred $R_f$ groups are monovalent fluoroaliphatic radicals that are stable, inert, non-polar, oleophobic and hydrophobic. $R_f$ can be a straight chain, a branched chain, and if sufficiently large, cyclic, or combinations thereof, such as alkylcycloaliphatic radicals. Generally $R_f$ can have from 1 to about 20 carbon atoms, preferably from 4 to about 20, and most preferably from 4 to 12 carbon atoms. Preferred $R_f$ groups are fully or substantially completely fluorinated, such as perfluoroalkyl compounds, i.e. $C_{n-F2n+1}$, where n is 4 to 20 or perfluorocycloalkyl, i.e. $C_nF_{2n-1}$, where n is 5 to 20, or combinations of perfluoroalkyl and perfluorocycloalkyl.

Q is a divalent linking group connecting the $R_f$ group to a nitrogen atom. The Q group can preferably comprise an electron withdrawing group such as a sulfonyl group ($—SO_2—$) or a carbonyl group ($—C(O)—$), and can optionally comprise an electron withdrawing group connected to an alkylene group, wherein the alkylene group is attached to the $R_f$ group. For example, the Q group can be an alkylene group connected to a carbonyl group (e.g., $—C_2H_4C(O)—$), or an alkylene group connected to a sulfonyl group (e.g., $—CH_2SO_2—$).

X is a divalent linking group between the Z group and a nitrogen atom. The divalent linking group X can be any of a number of linking groups, such as an alkylene group, or an alkylene group that optionally includes one or more fluorine atoms replacing one or more carbon-bonded hydrogen atoms. Examples of such divalent linking groups include lower alkylenes (e.g., methylene, ethylene, propylene, butylene, etc.), and fluorinated alkylenes (e.g., fluoromethylene, fluoroethylene, fluoropropylene, fluorobutylene, etc., any of which can be either partially or fully fluorinated). Alternatively, the divalent linking group X can comprise a fluorinated or non-fluorinated alkylene group that contains one or more heteroatoms such as N, O, or S, the heteroatom being either within the alkylene backbone or pendant from the alkylene backbone. Or, the divalent linking group X can be a sulfonyl ($—SO_2—$) or a carbonyl group ($—C(O)—$) alone, without an alkylene component.

Z can be any group that imparts water solubility to the water-soluble surface tension-reducing compound (also referred to herein as a "water-solubilizing group"), and can be any of a number of water-solubilizing groups that are known in the chemical art, including anionic, nonionic, cationic, amphoteric, and amine oxide groups. Examples of nonionic water-solubilizing groups include alkoxyalkylene groups such as polyoxyalkylene groups (e.g., $—(C_2H_4O)_n—R^6$) wherein $R^6$ is hydrogen or a lower alkyl such as methyl or ethyl, and n is an integer greater than 1, preferably in the range from about 3 to 14. Examples of anionic water solubilizing Z groups include carboxylic acids (COOH), carboxylate salts ($COO^-M^+$, wherein $M^+$ can be a suitable counterion such as ammonium or a metal ion; e.g., $K^+$, $Na^+$, $Li^+$, $NH_4^+$, $N(R^7)_4^+$ etc., and wherein each $R^7$ is independently a lower alkyl), sulfonic acids or sulfonic salts ($—SO_3H$ or $—SO_3^-M^+$, wherein $M^+$ is as previously defined), phosphonic acids or phosphonic salts ($—HPO_3$ or $—PO_3^-M^+$, wherein $M^+$ is as previously defined), etc. Examples of amphoteric water solubilizing Z groups include betaine groups (e.g., $—N^+(CH_3)_2COO^-$). Examples of cationic water solubilizing Z groups include quaternary ammonium salts (e.g., $—N^+(R^8)_3X^-$ wherein each $R^8$ is independently a lower alkyl or aryl, and X is a suitable anion such as $Cl^-$, $I^-$, $OH^-$, etc.); and, phosphonium salts (e.g., $—P^+(R^9)_3X^-$, where $R^9$ is hydrogen or a lower alkyl, and X is a suitable anion as previously defined).

Preferred water-soluble adhesion-promoting compounds include fluoroaliphatic sulfonyl compounds including the following:

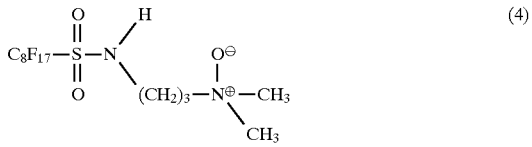

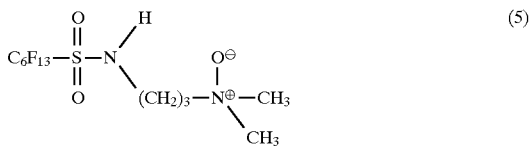

wherein $M^+$ is a suitable counterion as defined above. These fluoroaliphatic sulfonyl compounds can be used singly or together as a mixture of two or more of these or other water-soluble surface tension-reducing compounds.

The water-soluble surface tension-reducing compound can be present in the aqueous bonding composition in an amount that will provide a useful wetting of the substrate, and effective adhesion between the substrate and the fluoropolymer. By "water-soluble," it is meant that the adhesion-promoting compound will dissolve sufficiently in the aqueous bonding composition, without the aid of a substantial amount of organic solvent, to provide an aqueous bonding composition of a useful surface tension and that will provide effective adhesion between the substrate and the fluoropolymer. The concentration of the water-soluble surface tension-reducing compound required to provide a desired surface tension and level of adhesion will be a function of: the particular water-soluble surface tension-reducing compound used; the identity and amounts of other components of the aqueous bonding composition, such as the silane compound; and the particular fluoropolymer and substrate desired to be bonded together. For instance, the water-soluble surface tension-reducing compound is preferred present in such a concentration that the surface tension of the aqueous bonding composition be lower than 50 millinewtons per meter, more preferably below 30 millinewtons per meter, at a concentration of 0.1 percent by weight. Surface tension can be measured by methods that are known in the chemical art, such as by the DuNuoy Ring method. At the same time, the surface tension reducing group should not be present in an excessive amount, e.g., an amount that would result in excessive foaming.

As an example of a useful concentration, some water-soluble surface tension-reducing compounds have been found to be effective at concentrations in the range from about 0.05 to 5 parts by weight, based on 100 parts aqueous bonding composition. Preferred concentrations of the water-soluble surface tension-reducing compound can be in the range from about 0.1 to 1 parts by weight, based on 100 parts aqueous bonding composition, with the range from about 0.1 to 0.5 parts by weight being especially preferred.

Water-soluble surface tension-reducing compounds can be prepared by known methods. As an example, water-soluble fluoroaliphatic sulfonamide compounds can be prepared by the reaction of ammonia or primary amines with perfluoroalkane sulfonyl fluorides (sulfonyl fluorides can be obtained, e.g., by electrochemical fluorination of alkyl or alkylene sulfonyl halides). Methods of preparing sulfonyl fluorides, as well as fluoroaliphatic sulfonamide compounds are described, for example, in U.S. Pat. Nos. 2,732,398 price et al), 2,759,019 (Brown), 2,809,990 (Brown), 2,915,554 (Ahlbrecht), and 3,094,547 (Heine). Similarly, water-soluble fluoroaliphatic carboxamide compounds are known in the chemical art, and can be prepared by known methods including the reaction of a perfluoroalkyl monocarboxylic acid fluoride with a dialkylaminopolymethyleneamine. See e.g., U.S. Pat. Nos. 2,764,602 (Ahlbrecht), and 2,764,603 (Ahlbrecht).

Optionally, the aqueous bonding composition may further comprise other known and useful ingredients. These additional ingredients can include added silane compounds that are copolymerizable with the silane compound, but are not reactive with the water-soluble surface tension-reducing compound or the fluoropolymer, e.g., vinyl triethoxysilane. One skilled in the art will recognize that such a copolymerizable silane compound may be added to the aqueous bonding composition to improve the cohesive strength of the cured aqueous bonding composition.

The aqueous bonding composition of the present invention can be prepared by dissolving or dispersing a desired quantity of silane compound and water-soluble surface tension-reducing compound in water. Before application to a substrate or fluoropolymer, the aqueous bonding composition is preferably allowed to stand at room temperature for a time sufficient to allow the silane compound to hydrolyze to a silanol form. Sufficient hydrolyzation may occur nearly instantaneously, e.g., within about 15 seconds, or may take longer, possibly in excess of 48 hours, depending upon the particular silane compound.

Once prepared, the aqueous bonding composition of the present invention can be applied to a surface of a substrate or fluoropolymer using any conventional method for applying a coating to a substrate; e.g., immersion, spraying, painting, curtain coating methods, etc. After application, excess aqueous bonding composition can be allowed to drain off the surface, and the coating can be allowed to dry either at room temperature (e.g., for about 10 to 30 min.) or the coated substrate can be heated to 50° to 60° C., or higher, e.g., 120° C., for about 15 minutes. It is believed that in addition to facilitating drying of the aqueous bonding composition coating, added heat also aids in the formation of a polysiloxane network.

Before being coated with the aqueous bonding composition, substrate surfaces can be prepared using conventional methods such as those described in Davis, D. J. and Kosmala, J. L., "A Practical Approach to Fluoropolymer Adhesion to Metal", presented at the Energy Rubber Group Adhesion Symposia, Houston, Texas, May 30, 1985, and the "Chemlok® 607" brochure no. DS10-6005J, published by the Lord Corporation in 1981. For example, nonmetallic substrate surfaces can be thoroughly cleaned using an appropriate solvent. Glass may be cleaned using an alkaline bath. The preparation of metallic substrates depends to some extent upon the type of metal. However, where roughening of the substrate surface is desired, the substrate can first be degreased using a suitable solvent such as trichloroethylene or Stoddard Solvent, then sandblasted (e.g., using 40 to 60 mesh alumina grit), and then the sandblasted surface can again be degreased. Alternatively, or in addition to other treatments, metal substrates can be phosphatized (e.g., to prevent corrosion), by known methods (see D. B. Freeman, *Phosphating and Metal Pre-Treatment*, (1986)).

The substrate can be designed such that when bonded to a fluoropolymer, the bonded multilayer article will be useful as a core, support, or insert, used in one of various molded seals, such as a shaft seal, a valve stem seal, or a gasket. The fluoropolymer can be bonded to the substrate by methods that are known in the fluoropolymer art, for instance by compression molding, transfer molding, or injection molding, etc.

The following examples are offered to aid in a better understanding of the present invention and are not to be unnecessarily construed as limiting the scope of the present invention.

EXAMPLES

Sample shaft seals were prepared in accordance with the present invention. Fluoropolymer used to prepare seal shaft Samples A and B are described in Table 1, which reports parts by weight of ingredients of the fluoropolymer.

TABLE 1

| Fluoropolymer | A | B |
|---|---|---|
| Fluorel ™ FC 2176 | 100 | — |
| Fluorel ™ FC 2177 | — | 100 |
| Huber MT N-990 (Carbon Black) | 30 | 30 |
| Elastomag 170 (MgO) | 3 | 9 |
| Rhenofit CF (CaOH) | 6 | 6 |
| Carnauba Wax | 0.75 | 0.75 |

Shaft seal Samples A and B were produced by injection molding the fluoropolymer onto a metal (carbon steel) ring support substrate having the following dimensions.

| Dimensions of metal ring support substrate | |
|---|---|
| diameter outside | 58 mm |
| diameter inside | 50 mm |
| height | 8.0 mm |
| wall thickness of metal | 1.0 mm |

Injection molding was accomplished using a DESMA 966.053 zo lab injection molding apparatus manufactured by Kloeckner Ferromatic Desma GmbH of Germany. The mold used in the injection molding apparatus had the following specifications:

| Number of cavities: | 1 |
|---|---|
| Part geometry: | |
| outside diameter | 60.5 mm |
| inner lip diameter | 44 mm |
| height | 10 mm |
| Thickness of rubber layer | 1 mm average |
| Rubber volume in part | 5.3 cm3 |
| Total shot volume | 7.6 cm3 |
| Sprue: | |
| length | 14 mm |
| diameter | 5 mm |
| Runner system: | |
| Type | umbrella |
| Diameter | 44 mm |
| Gate: | circular |
| Ejector system: | two step/hydraulic |
| Heating system: | in mold + heat plates on machine |
| Thermocouple close to cavity: | 4 |
| Vacuum canal: | Central |
| Mold steel: | STAVAX ESR |
| Surface finish: | EDM |

Prior to injection molding each Sample, the mold was prepared according to the following procedure. The mold surface was blasted with 50–150 micron glass beads under 0.2 MPa pressure for 10 minutes. The mold surface was then cleaned using an ultrasonic cleaning device, and a water-based caustic solution, at 80 degrees Celsius for 10 minutes after a 30-minute warm-up in the bath. Next the mold was rinsed with deionized water and dried before use.

The metal ring supports for the shaft seals were prepared by degreasing the metal ring supports by manually wiping off any excess oil, followed by rinsing with perchlore ethylene, and evaporative drying while lying on a paper towel. The ring supports were then placed in a caustic bath at 70° C. to 80° C. for 8 to 10 min. The caustic bath was a 5 weight percent solution of Extran AP 12 alkaline from Merck dissolved in hot (70° to 80° C.) deionized (DI) water. After the caustic bath, the ring supports were rinsed three times in cold DI water.

Immediately after degreasing, the degreased metal ring supports were phosphatized according to the following procedure. The degreased ring supports were taken from the last rinsing bath and placed in a phosphatizing bath of a 2% by weight solution of 758 g ZnO, 1.89 liter $H_3PO_4$ (75% by weight in water), and 1.89 liter DI water. Then $NaNO_2$ was added as a 25% solution to give a concentration of about 0.02 wt% $NaNO_2$ in the bath. The temperature of the bath was maintained at 75°–80° C. and stirred, and the ring supports were submersed for 8 to 10 minutes. Then the phosphatized ring supports were rinsed three times in cold DI water and dried in a 75° C. forced air oven for 8 to 10 minutes. After phosphatizing 25 to 30 ring supports, a fresh solution was prepared, and the rinsing baths were filled with fresh DI water. The dry ring supports were stored in a closed plastic container.

Next, the aqueous bonding composition was applied to the degreased, phosphatized, ring support according to the following procedure. The phosphatized ring supports were dipped in the bonding agent solution and dried in forced air while rotating on a stainless steel wire. The ring supports were then heated for 10 minutes in a 70° C. forced air oven, followed by heating for 20 minutes in a 140° C. oven.

Four different compositions were prepared and tested as aqueous bonding agents:

A stock solution was made by dissolving 25.01 grams of 3-(triethoxysilyl)-propylamin in DI water and diluting with DI water to a total of 500.0 grams. This 5% solution was the reference aqueous bonding agent.

Aqueous Bonding Agent 1 (BA-1) was prepared by adding 99 grams of the above stock solution to 1.01 grams of a 30% (wt) in water solution of $C_8F_{17}SO_2NH(CH_2)_3NO(CH_3)_2$.

Aqueous Bonding Agent 2 (BA-2) was prepared by adding 99 grams of the stock solution to 1.00 grams of a 30% (wt) in water solution of $C_6F_{13}SO_2NH(CH_2)_3NO(CH_3)_2$.

Aqueous Bonding Agent 3 (BA-3) was prepared by adding 99 grams of the above stock solution to 1.01 grams of a 30% (wt) in water solution of $C_8F_{17}SO_2NH(CH_2)_3COOK$.

Before molding the Sample shaft seals (10 of each), the injection molding apparatus was run until steady state conditions were reached. During operation to reach steady state conditions, metal inserts were used that had the above dimensions, and that had been phosphatized but not treated with bonding agent. Steady state machine settings for the different Samples were as follows:

TABLE 3

| Fluoropolymer | | A | B |
|---|---|---|---|
| Mold temperature | deg C | 190 | 190 |
| Screw barrel temp | deg C | 60 | 60 |
| Screw speed | % of max | 35 | 35 |
| Plastication delay | sec | 2 seconds after holding time | |
| Backpressure | Bar | 3 | 3 |
| Injection barrel temp | deg C | 95 | 95 |
| Injection speed | % of max | 60 | 60 |
| Vacuum time | sec | 2.5 | 2.5 |
| After inj pressure 1 | Bar | 32 | 32 |
| After inj time 1 | sec | 6 | 6 |
| After inj pressure 2 | Bar | 30 | 30 |
| After inj time 2 | sec | 10 | 10 |
| Holding time | sec | 18 | 40 |
| Heating time | sec | 32 | 58 |

Bonding results

The adhesion between the metal ring support and each of fluoropolymers A and B was tested with each of the four aqueous bonding compositions. Testing the quality of metalbonding on injection molded shaft seals can only be done in a destructive way. No standardized method exists for testing and representation of such adhesion data. Additionally, the large forces that act upon the bonded article during automatic ejection of the parts can have a major effect on the results of the test. This is especially true when the parts have a tendency to stick to the mold surface. The rating system used below to test the above seal shaft Samples accounts for these possibilities, and is therefore different for each of Fluoropolymers A and B.

Fluoropolymer A

Fluoropolymer A proved very difficult to demold, and there was a tendency to disrupt the bond during the automatic demolding. Thus, one indication of bond strength was the number of Samples that survived the automatic hydraulic ejection from the mold, without the fluoropolymer delaminating from the metal ring support. Table 4 below describes the amount of fluoropolymer, in percent, which remained on the ring support after automatic hydraulic ejection from the mold, for each of the four bonding agents.

TABLE 4

|  | REF | BA 1 | MBA 2 | MBA 3 |
|---|---|---|---|---|
| % rubber left on outside of ring after demolding (average on 10 rings for each bonding agent) | 18% | 48% | 25% | 47% |

Table 4 shows a significant improvement in adhesion for bonding agents 1, 2, and 3, over the reference aqueous bonding agent.

Fluoropolymer B

Fluoropolymer B showed good demolding behavior and also good bond strength between the fluoropolymer and the metal ring support. Ten Samples were prepared for each bonding agent.

TABLE 5

|  | REF | MBA 1 | MBA 2 | MBA 3 |
|---|---|---|---|---|
| Number of rings with 100% bond left after demolding | 8/10 | 10/10 | 10/10 | 10/10 |
| Number of rings with bond sufficiently strong that rubber could not be removed with fingernail (pliers needed) (after cool down) | 0/10 | 5/10 | 3/10 | 0/10 |

Table 5 indicates that bonding agents BA-1, BA-2, and BA-3 provide improved bonding properties to the metal ring support over the reference Bonding Agent.

What is claimed is:

1. An aqueous bonding composition useful for bonding a fluoropolymer to a substrate, the aqueous bonding composition comprising:
    (a) a silane compound;
    (b) a surface tension-reducing compound having the general formula:

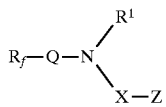

(1)

wherein
    R1 is hydrogen or a lower alkyl;
    Rf is a monovalent fluoroaliphatic group;
    Q is a divalent linking group
    X is a divalent linking group; and
    Z is a water-solubilizing group;
    (c) water; and
    (d) substantially no organic solvent;
   wherein the aqueous bonding composition contains a preponderance of water.

2. The aqueous bonding composition of claim 1, wherein:
    $R_f$ is a straight, branched, or cyclic, monovalent fluoroaliphatic group having from 1 to about 20 carbon atoms;
    Q is a divalent electron withdrawing group chosen from the group consisting of: a sulfonyl group, a carbonyl group, an alkylene group connected to a carbonyl group, or an alkylene group connected to a sulfonyl group;
    X is a divalent alkyl or alkoxy linking group;
    Z is a water-solubilizing group chosen from the group consisting of polyoxyalkylene; amine oxide, carboxylate salt; carboxylic acid; sulfonic salt; sulfonic acid salt; quaternary ammonium salt; and phosphonium salt.

3. The aqueous bonding composition of claim 1, wherein the water-soluble surface tension-reducing compound has the general formula:

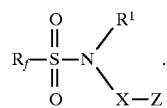

4. The aqueous bonding composition of claim 3, wherein $R_f$ is a perfluoroalkyl group having from 1 to 20 carbon atoms.

5. The aqueous bonding composition of claim 4, wherein the water-soluble surface tension-reducing compound is chosen from the group consisting of:

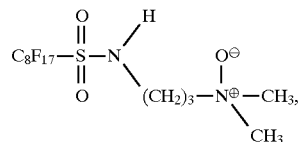

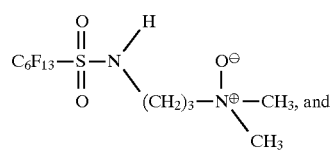

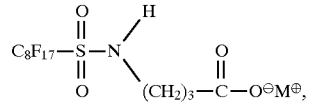

wherein $M^+$ is a counterion.

6. The aqueous bonding composition of claim 1, wherein the aqueous bonding composition comprises from about 0.05 to 5 parts by weight water-soluble surface tension-reducing compound, based on 100 parts aqueous bonding composition.

7. The aqueous bonding composition of claim 6, wherein the aqueous bonding composition comprises from about 0.1 to 0.5 parts by weight water-soluble surface tension-reducing compound, based on 100 parts aqueous bonding composition.

8. The aqueous bonding composition of claim 1, wherein the aqueous bonding composition comprises from about 0.1 to 10 parts by weight silane compound, from about 0.05 to 5 parts by weight fluoroaliphatic sulfonyl compound.

9. A bonded article comprising a fluoropolymer material bonded-to a substrate with an aqueous bonding composition comprising:
    (a) a silane compound;
    (b) a surface tension-reducing compound having the general formula:

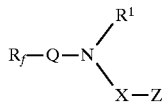
(1)

wherein
R1 is hydrogen or a lower alkyl;
Rf is a monovalent fluoroaliphatic group;
Q is a divalent linking group
X is a divalent linking group; and
Z is a water-solubilizing group;
(c) water; and
(d) substantially no organic solvent;
wherein the aqueous bonding composition contains a preponderance of water.

10. The bonded article of claim 9, wherein:
$R_f$ is a straight, branched, or cyclic, monovalent fluoroaliphatic group having from 1 to about 20 carbon atoms;
Q is a divalent electron withdrawing group chosen from the group consisting of: a sulfonyl group, a carbonyl group, an alkylene group connected to a carbonyl group, or an alkylene group connected to a sulfonyl group;
X is a divalent alkyl or alkoxy linking group;
Z is a water-solubilizing group chosen from the group consisting of polyoxyalkylene; amine oxide, carboxylate salt; carboxylic acid; sulfonic salt; sulfonic acid salt; quaternary ammonium salt; and phosphonium salt.

11. The bonded article of claim 9, wherein the water-soluble surface tension-reducing compound has the general formula:

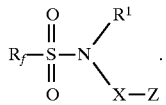

12. The bonded article of claim 11, wherein $R_f$ is a perfluoroalkyl group having from 1 to 20 carbon atoms.

13. The bonded article of claim 12, wherein the water-soluble surface tension-reducing compound is chosen from the group consisting of:

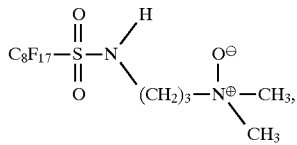

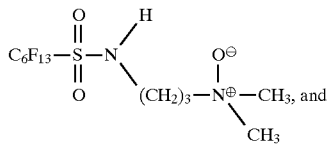

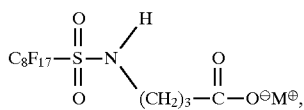

wherein M+ is a counterion.

14. The bonded article of claim 9, wherein the substrate comprises a metal.

15. The bonded article of claim 9, wherein the bonded article comprises a shaft seal, a valve stem seal, or a gasket.

16. A method of improving the adhesive bond strength between a fluoropolymer and a substrates the method comprising the steps of:
(1) providing a substrate and a fluoropolymer;
(2) providing an aqueous bonding composition comprising:
(a) a silane compound;
(b) a surface tension-reducing compound having the general formula:

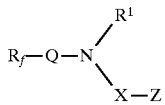
(1)

wherein
R1 is hydrogen or a lower alkyl;
Rf is a monovalent fluoroaliphatic group;
Q is a divalent linking group
X is a divatent linking group; and
Z is a water-solubilizing group;
(c) water; and
(d) substantially no organic solvent;
wherein the aqueous bonding composition contains a preponderance of water.

17. The method of claim 16, wherein:
$R_f$ is a straight, branched, or cyclic, monovalent fluoroaliphatic group having from 1 to about 20 carbon atoms;
Q is a divalent electron withdrawing group chosen from the group consisting of a sulfonyl group, a carbonyl group, an alkylene group connected to a carbonyl group, or an alkylene group connected to a sulfonyl group;
X is a divalent alkyl or alkoxy linking group;
Z is a water-solubilizing group chosen from the group consisting of polyoxyalkylene; amine oxide, carboxylate salt; carboxylic acid; sulfonic salt; sulfonic acid salt; quaternary ammonium salt; and phosphonium salt.

18. The method claim 16, wherein the water-soluble surface tension-reducing compound has the general formula:

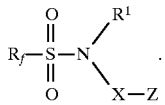

19. The method of claim 18, wherein $R_f$ is a perfluoroalkyl group having from 1 to 20 carbon atoms.

20. The method of claim 19, wherein the water-soluble surface tension-reducing compound is chosen from the group consisting of:

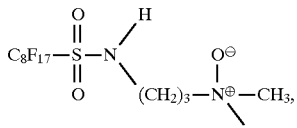

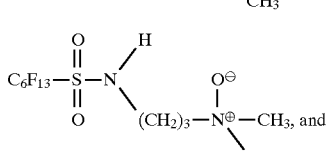

-continued

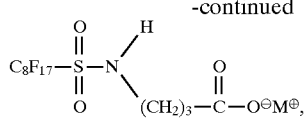

wherein M⁺ is a counterion.

21. The method of claim 16, wherein the aqueous bonding composition comprises from about 0.05 to 5 parts by weight water-soluble surface tension-reducing compound, based on 100 parts aqueous bonding composition.

22. The method of claim 16, wherein the aqueous bonding composition comprises from about 0.1 to 0.5 parts by weight water-soluble surface tension-reducing compound, based on 100 parts aqueous bonding composition.

23. The method of claim 16, wherein the aqueous bonding composition comprises from about 0.1 to 10 parts by weight silane compound, from about 0.05 to 5 parts by weight fluoroaliphatic sulfonyl compound.

* * * * *